United States Patent

Dehne

[15] 3,654,815
[45] Apr. 11, 1972

[54] MECHANICAL GEAR DRIVE
[72] Inventor: Hans D. Dehne, King of Prussia, Pa.
[73] Assignee: Crane Co., Chicago, Ill.
[22] Filed: Dec. 14, 1970
[21] Appl. No.: 97,601

[52] U.S. Cl. ............................................. 74/410, 74/411
[51] Int. Cl. ....................................................... F16h 57/00
[58] Field of Search ............................. 74/410, 411, 801

[56] References Cited

UNITED STATES PATENTS

| | | | |
|---|---|---|---|
| 641,379 | 1/1900 | Esmond | 74/410 |
| 2,095,794 | 10/1937 | Corbin | 74/801 |
| 2,518,708 | 8/1950 | Moore | 74/410 |
| 2,547,877 | 4/1951 | Lucia | 74/410 X |
| 2,591,734 | 4/1952 | Smith et al. | 74/801 |
| 2,591,743 | 4/1952 | Thompson | 74/801 |
| 2,749,778 | 6/1956 | Kuhn | 74/411 X |
| 3,227,006 | 1/1966 | Bowen, Jr. | 74/801 |
| 3,257,869 | 6/1966 | Sharples | 74/410 X |
| 3,352,178 | 11/1967 | Lindgren et al. | 74/801 |
| 3,460,405 | 8/1969 | Simmons | 74/410 X |

FOREIGN PATENTS OR APPLICATIONS

| | | | |
|---|---|---|---|
| 864,183 | 1/1953 | Germany | 74/411 |
| 972,429 | 10/1964 | Great Britain | 74/411 |

Primary Examiner—Arthur I. McKeon
Assistant Examiner—Thomas C. Perry
Attorney—George S. Schwind

[57] ABSTRACT

A gear drive arrangement for rotating a ring gear of large diameter, as commonly used for rotating the rake structure for a slurry agitator, sedimentation tank, or the like. The gear drive incorporates a novel mounting and torque reactor device on which a plurality of gear members are positioned which equally distribute the torque to the ring gear. The planetary gears are driven by a pinion gear which is flexibly suspended from a gear reduction device. The tension device includes an indicator means for visual observation of the torque being transmitted to the ring gear and rake structure at a given time.

14 Claims, 5 Drawing Figures

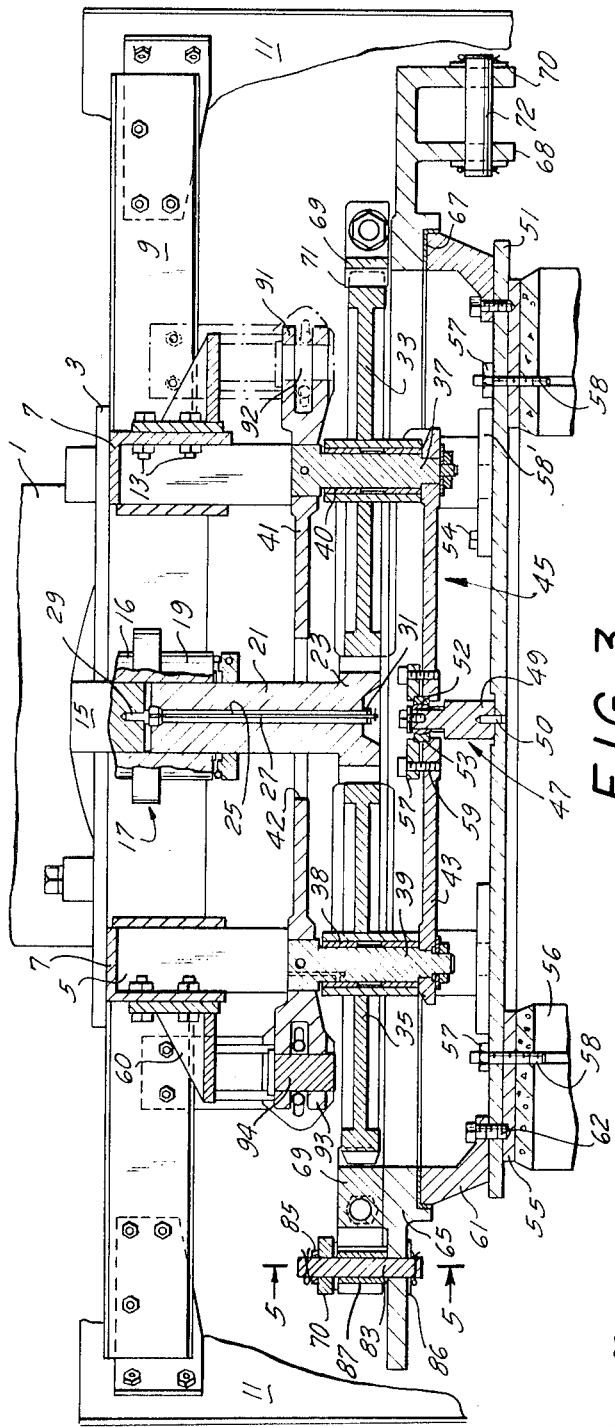
FIG. 3
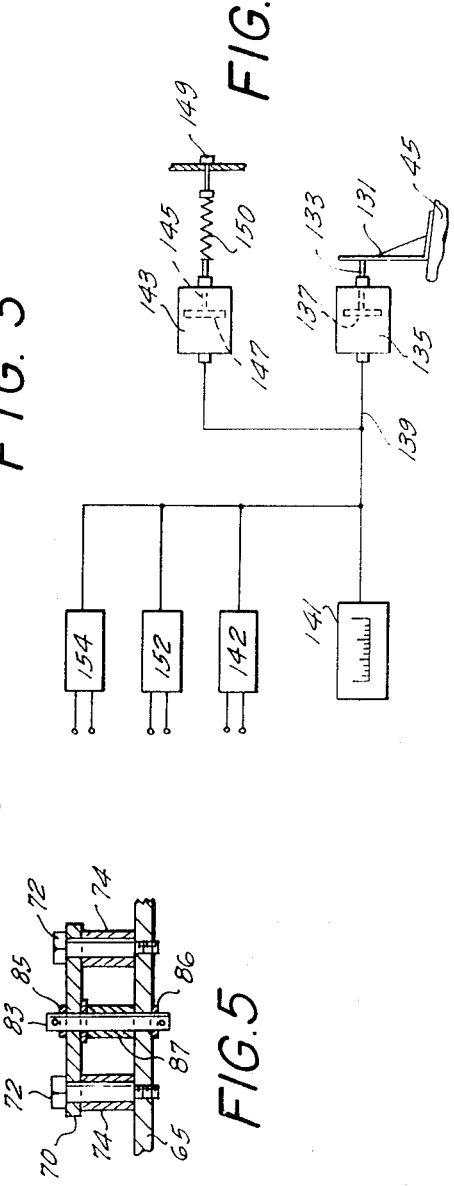
FIG. 4
FIG. 5

MECHANICAL GEAR DRIVE

This invention relates to a continuously operating sedimentation apparatus wherein a rake structure having horizontally extending arms is supported by and rotates around a center pier. The center pier, which is a hollow, vertical column, supports the drive means and rake structure in a well-known manner whereby the rake structure moves settled solids across the sedimentation tank bottom into a sump for subsequent withdrawal through a discharge conduit. In large sedimentation tanks, it is practical to utilize such a hollow column to support and drive the large rake structure. A frame, commonly called a cage, is connected to the rake structure and supported from the top portion of the column. A ring gear of large diameter is used to transmit rotation from a driving means, such as a gear reduction device, to the cage via a ring gear and turntable so that the cage, ring gear, turntable, and rake rotate as an assembly. The cage and rake are suspended from the turntable which is supported by bearings positioned on top of the center pier, which in turn support said ring gear. This invention is directed in particular to improvements in the drive means for imparting rotation to the ring gear and associated rake structure attached thereto.

Torque requirements for the rotation of the rake assembly in sedimentation tanks are enormous since the assembly may extend in length to 250 feet and weigh several tons. In addition, the rake assembly rotates at low speed and the torque requirements may be substantially increased by the sludge concentration of the slurry or influent into the tank.

The usual arrangement for the transmission of torque to a rake assembly in a sedimentation tank or slurry agitator utilizes a ring gear which may be attached to or be in driving relationship to the rake arms through a turntable rotating on top of the center pier. The driving means for the ring gear is usually some variation of a gear reducing mechanism. Numerous drive mechanisms for the transmission of torque from the drive gear of a gear reducer to the ring gear have heretofore been used. Such drive mechanisms provide for a plurality of gear trains in various configurations which supposedly distribute the torque equally to the ring gear. Most of these arrangements lack the flexibility desired for such drive mechanisms since precision, high-cost gearing is necessary for the mechanism to function. The high fabrication costs for large, precision gearing of the type necessary in the manufacturing of large scrapers and agitators contributes unproportionately to the overall cost of the system and often does not accomplish the intended purpose. It is, therefore, the primary object of the instant invention to overcome such difficulties by providing an improved drive system for a clarifier drive which is economical, reliable, and which substantially reduces the need of precision gearing.

Another object is the provision of a means for positive torque control and overload protection which might otherwise damage the drive mechanism and rake assembly.

Another object is to provide a drive means of planetary gear design having a novel mounting means for the intermediate gearing between the drive pinion and ring gear which allows only a predetermined amount of torque to be transmitted to the ring gear and associated rake arm at any given time.

Still another object is to provide a drive mechanism having substantially more flexibility in the mating gear components which are resiliently interbalanced during operation by a novel, adjustable spring arrangement.

Another object is to provide a means for fast compensation of the unbalanced forces on the teeth of the ring gear to prevent damage thereto in the event excessive torque is transmitted to said ring gear.

Another object is to provide a drive mechanism which enables the ring gear to be fabricated in several sectors which are bolted together, substantially reducing its cost, and facilitating repair.

Still another object is a drive mechanism which has wide radial freedom of movement for the ring gear and driving pinion.

Another object is to provide a drive mechanisms wherein the torque transmitted to the ring gear may be visually observed and monitored during its operation.

Another object is to provide a gear drive whereby the shaft of the driving pinion is connected in a manner through a flexible coupling wherein the weight of said pinion and its shaft is suspended by a flexible rod, thereby providing a radially free-moving pinion gear.

Other objects and features of advantage will be set forth in the following description and accompanying drawings whereby the embodiment disclosed is a preferred one and is shown for exemplary purposes only since other variations may be readily observed by one skilled in the art.

IN THE DRAWINGS

FIG. 3 is a cross-sectional view taken along line 2—2 of FIG. 1 showing the gear arrangement of the drive mechanism;

FIG. 4 is a schematic of the torque indicator of the drive mechanism; and,

FIG. 5 is a cross-sectional view taken along line 5—5 of FIG. 3 showing the driving arrangement between the ring gear and turntable.

Figure 1:
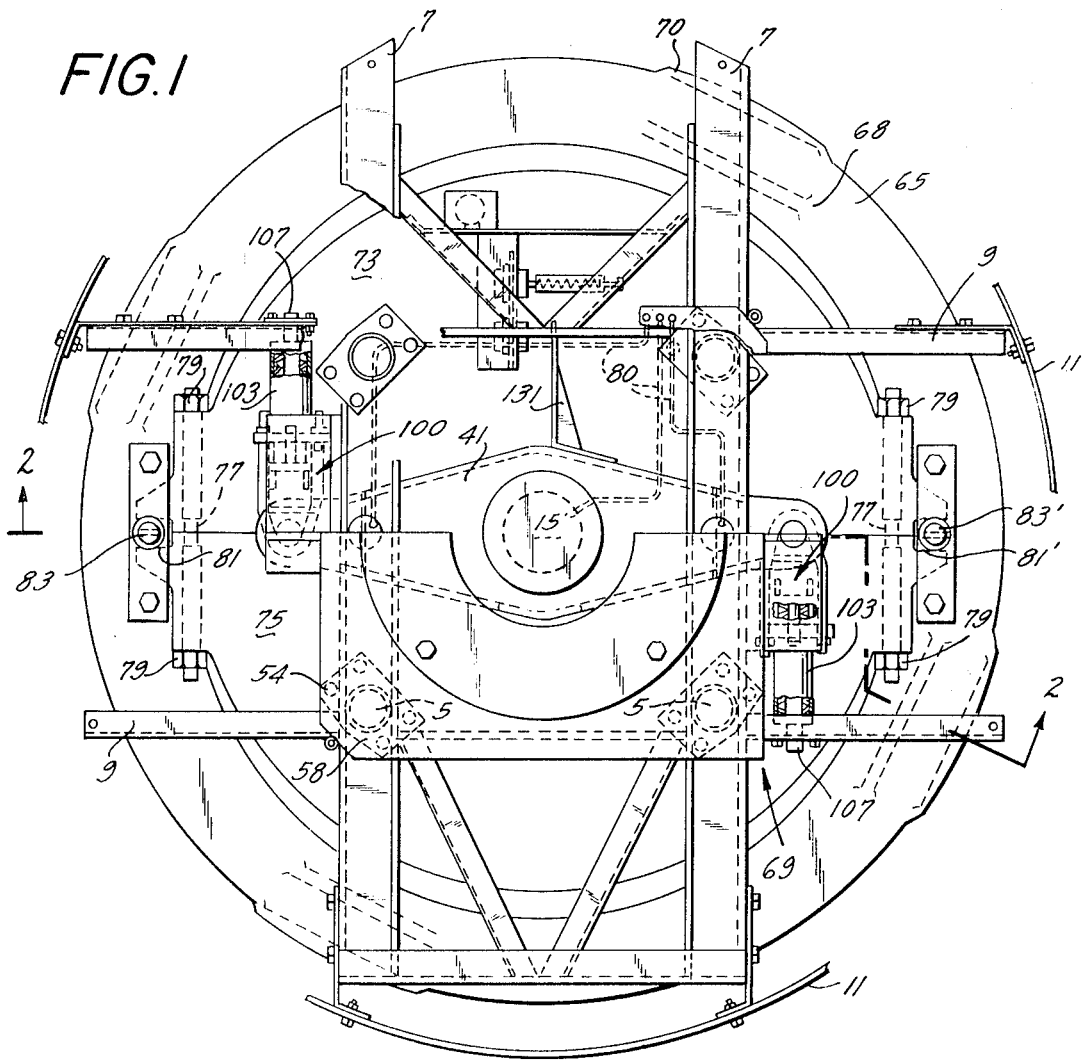
FIG. 1 is a top view of the drive mechanism for a clarifier or the like, showing the gear cage, ring gear and tensioning means.

With reference to the Drawings, and in particular FIGS. 1 and 3, the driving means for the rake structure, as commonly used in sedimentation tanks, is a motor which is attached to a gear reducer, neither of which are shown since they form no part of the instant invention. Both motor and gear reducer are housed within casing 1 and mounted on a mounting plate 3 which is positioned on a plurality of pillars 5 affixed to the stationary frame elements 7 of the clarifier or sedimentation tank (not shown) in the usual manner. Although not shown, the frame 7 normally forms a support for a catwalk to provide access to the center pier of the tank which includes the drive mechanism for the rake structure. Frame 7 also includes the cross frames 9 which extend perpendicular to the elements 7. A skirt 11 extends around the outer periphery of the frames 7 and 9 for protective purposes.

The mounting plate 3, pillars 5, and frames 7 and 9 are welded together and bolted to the base plate 51 by means of pillar bottom plate 58' and bolts 54. Associated supporting means, e.g. support bracket 60 for supporting torque reactor means 100, may be attached by conventional fastener means 13, as clearly shown, or may be welded.

The output of the gear reducer housed in casing 1 includes a drive shaft 15 which protrudes below mounting plate 3 to enable one end 16 of a flexible coupling 17 of conventional design to be affixed thereto. The other end 19 of coupling 17 is affixed to shaft 21 of drive pinion 23. In addition to the flexible connection between shafts 15 and 21, shaft 21 has an axial bore 25 therethrough. Positioned within bore 25 is a flexible rod 27 which is affixed to pin 29, by welding or the like, and tightly pressed into shaft 15. A nut with a spherical washer 31 is threadedly positioned over the free end portion of the rod 27 which protrudes beyond drive pinion 23 whereby the gear 23 and shaft 21 are thus supported by and suspended from shaft 15 by means of said rod.

Pinion 23 engages two planetary, or intermediate, gears 33, 35 which are diametrically opposite the center line of said pinion. Gears 33, 35 are mounted on shafts 37, 39, respectively, with sleeve bearings 38, 40 positioned between the shaft and gear hub to enable the said gears to be freely rotatable on their respective shafts. Gears 33, 35 are positioned between top and bottom plates 41, 43, respectively, whereby the entire assembly forms a gear cage assembly indicated generally by reference numeral 45. Plate 41 has a central orifice 42 therein to enable shaft 21 of gear 23 to pass therethrough so that it may be supported as described above. Shafts 37, 39 are secured to the bottom plate 43 of gear cage 45 by any suitable means, as shown. Conventional lubrication line 80 provides means to lubricate the respective shafts of the gear drive mechanism.

Cage assembly 45 is supported by a spherical bearing assembly 47 which is positioned in axial alignment with pinion 23 and shaft 21. Bearing assembly 47 includes a mounting stud 49 which is welded to and projects upwardly from base plate 51 and is centered thereto by pin 50. Spherical sleeve 52 with outer-bearing ring 53 is positioned on top of the stud 49 for universal movement. Ring 53 is clamped to bottom plate 43 by a clamping ring 57 and screw means 59, as clearly shown in FIG. 3. It is thus seen that bottom plate 43, which is part of cage 45, may tilt in any desired plane because of the unique mounting provided for the gears 33, 35 and cage 45 which is permitted by the bearing assembly 47. Plate 51 generally covers the center hollow pier 56 which may be of concrete or steel construction. The usual foundation plate 55 is interposed between pier 56 and base plate 51. Plates 51 and 55 are affixed to pier 56 by nut means 57 which are threadedly positioned on studs 58 located in the pier, as clearly shown in FIG. 3. Thus, gear cage 45 is so constructed and mounted on bearing assembly 47 that the entire assembly may tilt in any direction to accommodate the torque requirements imposed thereon and transmitted from the pinion 23 through gears 33, 35 in a manner to permit self-adjustment of the tooth forces acting on said gears. It is noted that the gears 33, 35 are centered with respect to the pinion 23 and they are also journaled an equal distance from bearing assembly 47. Although two intermediate gears are shown, it is understood that three, four, or more, could be equi-spaced around drive pinion 23, if so desired.

Positioned on top of bearing ring 61, which is secured to plate 51 by screws 62, is a large turntable 65. The turntable 65 rotates on bearing ring 61 in a manner to be hereinafter described. To reduce the friction between the ring and turntable, thin, plastic strips are bonded to the turntable forming an axial and radial sleeve bearing between the mating elements at all points of potential contact. Turntable 61 has positioned on its top, a ring gear 69 which has teeth 71 projecting on its inner periphery around its entire circumference, as clearly shown in FIG. 3. To support and suspend the rake and cage assembly, not shown, four pairs of downwardly extending brackets 68, 70, having supporting pins 72 thereon, are equally positioned around the outer periphery of the turntable 65. It is understood that these pins 72 carry the weight of the rake and cage assembly so that the same are rotated upon rotation of the turntable 65, in a manner well known in the art.

The planetary gears 33, 35 mesh with the internal teeth of the ring gear so that it is rotated at diametrically opposite points on its periphery by the said gears. Ring gear 69 consists of two semicircular discs or sectors 73, 75 which are secured together by bolts 77 and nuts 79 at opposite locations on their outer periphery whereby the bolts pass through protruding sections of the gear sectors, as clearly shown in FIG. 1. These gear sectors enable the ring gear 69, which is normally several feet in diameter, to be cast in several pieces and later assembled, thus reducing the cost and complexity of installing in the field for maintenance and repair purposes. Although a two-sector gear is shown, it is understood that this gear could be made of a plurality of sectors all secured together by a bolt means to form a unitary structure. Recesses 81 and 81', located diametrically opposite each other between the respective sectors on the outer periphery of the ring gear, cooperate with drive pin 83, 83', respectively, to impart rotary motion to the turntable 65 when the ring gear 69 is rotated by planetary gears 33, 35.

It will be observed that the recesses 81, 81' are so constructed that they provide slots for the drive pins 83, 83', respectively, so that the ring gear 69 may be laterally displaced during its rotation in order to accommodate variations in its contours and also provide for any imbalance of tooth forces in the drive gear mechanism. Drive pins 83, 83' are attached to the turntable as clearly shown in FIGS. 3 and 5, as exemplary, wherein washers 85, 86 are placed above support bar 70 and below turntable 65, respectively. Appropriate cotter pins are placed at the extreme ends of the drive pins to prevent the same from becoming displaced. Support bar 70 is rigidly attached to turntable 65 by two bolts 72, and the distance from the turntable is established by bushings 74 which are placed between the bar 70 and turntable 65, as shown in FIG. 5. A sleeve bearing 87 is placed around pin 83 since the recess 81 of the ring gear 69 forms a driving connection between the gear and turntable 65 at this point. A similar arrangement may be used by drive pin 83'.

As noted above, gear cage 45 is so constructed and mounted that it may tilt in any direction during operation to facilitate the adjustment for optimum tooth contact between the ring gear and intermediate gears.

Additionally, cage 45 may rotate a limited amount since the cage is pivoted on the said bearing assembly 47. To equally distribute the torque to the ring gear 69 and also record the same reference is made to FIGS. 1 and 3 wherein top plate 41 has yokes 91, 93 positioned on a center line passing through adjacent shafts 37, 39, respectively. The yokes 91, 93 are positioned as shown whereby pins 92, 94, respectively, may be inserted therein and are prevented from falling through their respective yokes because their head portions extend beyond the diameter of the bores in which the pins are positioned.

Figure 2:
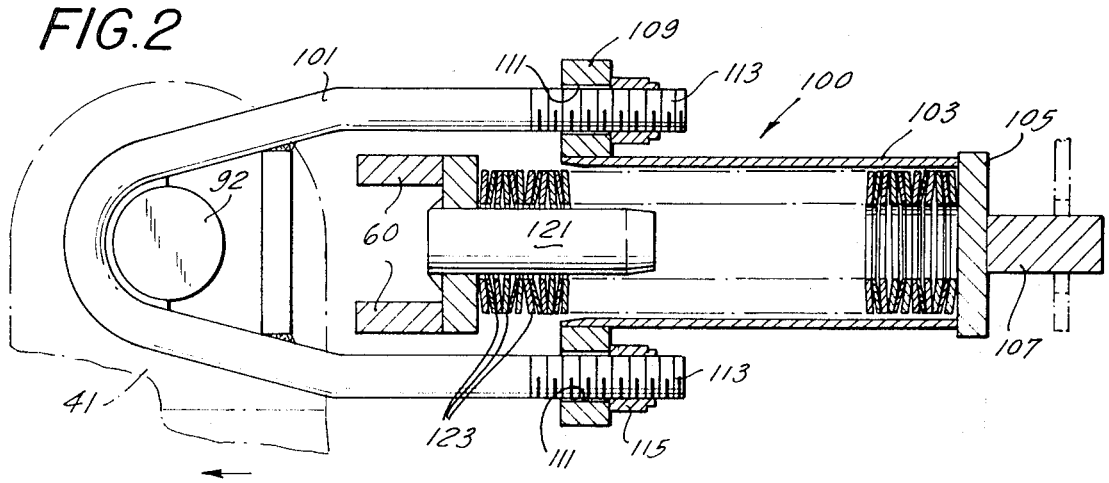
FIG. 2 is an enlarged, cross-sectional view taken along the axis of one of the the tensioning means.

With reference to FIG. 2, a torque reactor means 100 is provided between bracket 60 on the stationary frame 7 and gear cage 45. Spring means 100 includes a U-bolt 101 positioned around each respective pin 92, 94. For purpose of illustration, the torque spring means is shown positioned with reference to pin 92. Torque reactor means 100 also includes a cylinder 103 having a closed end 105 with an axial projection 107 thereon. Cylinder 103 further includes a flange portion 109 at its open end having orifices 111 therein which are adapted to receive the threaded free ends 113 of U-bolt 101, respectively. The cylinder 103 may be axially adjusted relative to U-bolt 101 by means of adjusting nuts 115 which are positioned on the threaded ends 113 of the said U-bolt.

Within cylinder 103 is a centrally positioned shaft 121 which is secured to bracket 60 to prevent relative movement therebetween. Within the cylinder 103 and also positioned on shaft 121 are a plurality of Belleville spring washers 123. Since gear cage 45 is pivotally mounted and centrally supported by spherical bearing assembly 47, it will be obvious that any torque transmitted to the ring gear 69 by the gears within cage 45 will be counteracted by the springs 123 which will proportionately resist the forces imposed on cage 45. Upon incurring an imbalance, the cage, because of the direct rotation of the ring gear, will tend to rotate in the direction shown in FIG. 2, thus compressing the Belleville spring washers and offer a reaction force to resist the torque being transmitted to the ring gear 69. Thus, the amount of torque which is transmitted to the gears will be absorbed by the torque reactor which is functioning at each end of the gear cage, such torque being capable of being recorded by means hereinafter described. The particular arrangement and number of Belleville spring washers may be varied to meet the torque demands imposed on the gear mechanism. It is also understood that the deflection of the springs upon compression forms a means of calculating the torque being subjected on the gear mechanism.

Affixed to the top plate 41 of gear cage 45 is an actuator lever 131, as shown in FIGS. 1 and 4. Lever 131, which rotates in proportion to the angular displacement of gear cage 45, is also positioned so as to be centrally oriented with reference to shaft 21. Thus, the range of deflection of the compression of Belleville springs 123 will be transmitted to lever 131. The travel of this lever 131 is then transmitted to stem 133 of hydraulic actuator 135 which acts as a sensing device for a hydraulic control system. Stem 133 is affixed to a plunger piston 137 within the actuator 135 whereby the hydraulic system, which is pressurized, consists of a tube line 139 which communicates with a conventional, calibrated, measuring device 141 to record the torque which is being transmitted within the gear mechanism, Hydraulically connected to this system and in parallel with actuator 135 is a second hydraulic actuator 143. Actuator 143 has a stem 145 and associated piston 147 and also an adjusting means 149 which regulates the compression of spring 150, permitting the entire system to be calibrated when there is no movement and zero torque imposed on the gear mechanism. At this time, the deflection of the Belleville springs on the cage 45 is also zero, and, there is no travel of the sensor stem 133. Since the hydraulic system is hydraulically closed, the movement of sensor stem 133 by lever 131 upon rotation of torque cage 45 will be registered by the pressure gage 141 after the unit is properly calibrated. Independent of the pressure indicating device 141 and in parallel to it, additional pressure receptive devices 142, 152, 154 are connected to the line 139. These additional devices are individually present each for a predetermined pressure, at which they respond and initiate the electrical control of the scraper drive motor, sludge pump, rake lifting mechanism, or any other appropriate alarm signal. As torque in the planetary gear system increases, the deflection of the torque spring will increase proportionately and thus a larger deflection will occur in lever 131 which will be hydraulically transmitted to all connected devices 141, 142, 152, 154, etc. which may be readily adapted to actuate appropriate controlling mechanisms. It is thus seen that the novel torque cage and its associated pressure responsive measuring means provides the necessary means for controlling other associated equipment in a sedimentation tank, slurry agitator, or similar device. In addition, it is specifically noted that the flexible coupling 17 provided between output shaft 15 and drive pinion 21 enables considerable self-adjustment to be transmitted through the gear drive to the planetary gears, and, that the spherical bearing 47 and the unique tilting and rotating provisions of the gear cage 45, coupled with the radial shifting capability of ring gear 69 provides an improved means of transmitting torque to a ring gear. Further, the drive mechanism is self-adjusting so that equal torque is transmitted to the ring gear from the respective planetary gears.

OPERATION

The operation of the novel gear drive mechanism is as follows:

Shaft 15 is driven by a motor through a conventional gear reducer contained in casing 1. Since most scraper and rake assemblies rotate clockwise with respect to their tank, shaft 15 is thus rotated counterclockwise. Shaft 21 and integral pinion gear 23, being driven by flexible coupling 17, also counterclockwise. Pinion gear 23 imparts rotary motion to planetary gears 33, 35. The planetary gears 33, 35 are thus rotated clockwise by drive pinion 23 whereby internal teeth of ring gear 69 cause the same to be driven at diametrically opposite points in a clockwise direction. Rotation of ring gear 69 imparts rotation to turntable 65 as pins 83, 83' project into recesses 81, 81', respectively, coupling the said gear 69 and turntable 65 together. Turntable 65, which is supported on bearing ring 61, carries the cage and rake structure (not shown) by supporting the same on a plurality of pins 72 which are equally spaced around the outer periphery of the turntable. As ring gear 69 commences rotation the torque required to rotate the rake, cage, and turntable is increased. Further, obstructions in the sedimentation tank, or, slurry build-up will increase the torque requirements. As the torque increases, an equal and opposite reactionary force occurs within the gear drive mechanism. Specifically, gear cage 45, which carries planetary gears 33, 35, is supported on a spherical bearing 45 which permits tilting and rotation of the cage 45 and the said planetary gears. As the torque increases, an equal and opposite reactive force is exerted by torque spring means 100 positioned at each end of the cage in a manner to counteract the particular direction of rotation of the gear mechanism. Deflection of spring reactor means 100 causes the entire cage 45 to be rotated about spherical bearing 47. Rotation of cage 45 also imparts rotation to actuator lever 131 which is affixed to said cage. Lever 131 transmits this movement to stem 133 of hydraulic sensing actuator 135 which hydraulically actuates torque indicating device 141 and all other connected control devices 142, 152, 154 when the present pressure is reached. Switches 142, 152, 154 may be conventional pressure responsive switches which are adapted to either open or close a respective circuit when the pressure in the line reaches a predetermined amount to control, shut-off, or monitor other circuits associated with the gear mechanism, or, other equipment associated with the rake structure. Since the pressure in line 139 is determined by the movement of piston 137 which responds to the movement of gear cage 45, it is apparent that various pressure settings may be utilized to control other equipment.

I claim:

1. A drive mechanism including:
   a. a drive pinion adapted to be rotated by a drive means;
   b. a plurality of intermediate gears in driving engagement with said drive pinion;
   c. a gear cage adapted to support said intermediate gears;
   d. a spherical bearing supporting said gear cage to permit rotation and tilting of said cage and gears about said bearing;
   e. a ring gear having internal teeth engaging said intermediate gears;
   f. resilient means adapted to exert a resistive force on said gear cage counteracting the torque transmitted in said drive mechanism, and wherein said gears are adapted to move substantially laterally relative to each other to compensate any imbalance.

2. A drive mechanism as defined in claim 1 wherein said gear cage includes a top plate and a bottom plate, said drive pinion extending through an orifice in said top plate, shaft means supported between said plates adapted to receive said intermediate gears for rotation thereon.

3. A drive mechanism as defined in claim 2 and further including a flexible coupling positioned between said drive pinion and said drive means.

4. A drive mechanism as defined in claim 3 wherein said drive pinion is suspended from said drive means, and wherein said drive pinion, flexible coupling and spherical bearing are in substantial axial alignment.

5. A drive mechanism as defined in claim 4 and further including pin means positioned between said plates at opposite ends thereof and wherein said resilient means includes a U-bolt positioned around each of said pins, an open end cylinder having a plurality of spring washers therein, and a shaft positioned within said cylinder adapted to receive said washers, said shaft being fixed, whereby the rotation of said gear cage is counteracted by the said spring washers.

6. A drive mechanism as defined in claim 5 and further including torque indicator means adapted to register the torque imposed on said drive mechanism at any given time.

7. A drive mechanism as defined in claim 6 wherein said torque indicator means includes a hydraulic cylinder, a piston positioned in said cylinder, said piston actuated by a lever affixed to said torque cage, an indicator, and, switch means adapted to respond to predetermined pressure, said cylinder, indicator, and switch means in communication with each other to form a closed hydraulic system.

8. A drive mechanism as defined in claim 7 wherein said intermediate gears are equi-spaced around the periphery of said drive pinion.

9. In a drive mechanism for a clarifier or the like wherein a rake structure is supported and driven by said drive mechanism, the combination including:
   a. a drive pinion adapted to be rotated by a drive means;
   b. a plurality of intermediate gears in driving engagement with said drive pinion;
   c. a ring gear having internal teeth engaging said intermediate gears;
   d. a gear cage adapted to support said intermediate gears;

e. a spherical bearing supporting said gear cage to permit rotation and tilting of said cage and gears;

f. a ring gear having internal teeth engaging said intermediate gears, said ring gear having a plurality of recesses in its outer periphery;

g. a turntable positioned in proximity to said ring gear, said turntable having a plurality of drive pins projecting therefrom and into said recesses forming a driving connection between said ring gear and turntable and wherein said ring gear is permitted to move laterally relative to said pins and said other gears;

h. resilient means adapted to exert a resistor force on said gear cage counteracting the torque transmitted in said drive mechanism, and wherein said gears are adapted to move radially relative to each other.

10. A drive mechanism as defined in claim 9 wherein said ring gear is comprised of a plurality of sectors fastened together.

11. A drive mechanism as defined in claim 10 and further including a flexible coupling positioned between said drive pinion and said drive means.

12. A drive mechanism as defined in claim 10 wherein said drive pinion is suspended from said drive means, and wherein said drive pinion, flexible coupling and spherical bearing are in substantial axial alignment.

13. A drive mechanism as defined in claim 9 and further including torque indicator means adapted to register the torque imposed on said drive mechanism at any given time.

14. A drive mechanism as defined in claim 13 wherein said torque indicator means includes a hydraulic cylinder, a piston positioned in said cylinder, said piston actuated by a lever affixed to said torque cage, an indicator, and, switch means adapted to respond to predetermined pressure, said cylinder, indicator, and switch means in communication with each other to form a closed hydraulic system.

* * * * *